US005924020A

United States Patent [19]

Forssén et al.

[11] Patent Number: 5,924,020

[45] **Date of Patent: *Jul. 13, 1999**

[54] ANTENNA ASSEMBLY AND ASSOCIATED METHOD FOR RADIO COMMUNICATION DEVICE

[75] Inventors: Ulf Forssén, Saltsjö-Boo; Sören Anderson, Stockholm; Björn Johannisson, Kungsbacka, all of Sweden

[73] Assignee: Telefonaktiebolaget L M Ericsson (publ), Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,280

[22] Filed: Dec. 15, 1995

[51] Int. Cl.[6] .......... H01G 3/22

[52] U.S. Cl. .......... 455/129; 455/277.1; 455/277.2; 342/373

[58] Field of Search .......... 455/562, 277.1, 455/277.2, 272, 33.1, 33.2, 33.3, 33.4, 561, 422, 443, 129; 342/372, 373, 374, 375, 354

[56] References Cited

U.S. PATENT DOCUMENTS

| | | | |
|---|---|---|---|
| 4,907,004 | 3/1990 | Zacharatos et al. | 342/373 |
| 5,274,384 | 12/1993 | Hussain et al. | 342/373 |
| 5,428,818 | 6/1995 | Meidan et al. | 455/33.3 |
| 5,444,762 | 8/1995 | Frey et al. | 455/561 |
| 5,488,737 | 1/1996 | Harbin et al. | 455/561 |
| 5,548,813 | 8/1996 | Charas et al. | 455/562 |
| 5,563,610 | 10/1996 | Reudink | 342/375 |
| 5,576,717 | 11/1996 | Searle et al. | 342/373 |
| 5,581,260 | 12/1996 | Newman et al. | 342/374 |
| 5,631,898 | 5/1997 | Dent | 370/203 |

FOREIGN PATENT DOCUMENTS

| | | |
|---|---|---|
| 0 593 822 A1 | 4/1994 | European Pat. Off. . |
| 2 209 629 | 5/1989 | United Kingdom . |
| WO 93/12590 | 6/1993 | WIPO . |

OTHER PUBLICATIONS

Adaptive Antenna Arrays for GSM900/DCS1800, U.Forssen et al., Proceedings of IEEE Vehicular Technology Conference, 1994.

Decoupled Maximum Likelihood Angle Estimation for Signals with Known Waveforms, J. Li et al., Technical Report CTH–TE–8, Feb., 1994, Chalmers University of Technology.

Beamforming: A Versatile Approach to Spatial Filtering, B.D. Van Veen and K. Buckley, IEEE ASSP Magazine, Apr. 1988, vol. 5, Issue 2, pp. 4–24.

An Adaptive Array for Mobile Communication Systems, S, Anderson et al., IEEE Trans. on Vehicular Technology, Feb. 1991.

Optimum Networks for Simultaneous Multiple Beam Antennas, E. DuFort, IEEE Trans. on Antennas and Propagation, Jan. 1992.

A Spectrum Efficient Cellular Base–Station Antenna Architecture, S.C. Swales and M.A. Beach, ,Centre for Communications Research, University of Bristol, UK, Personal and Mobile Radio Communications Conf., Warwick 1991, pp. 272–279.

*Primary Examiner*—Anand S. Rao
*Attorney, Agent, or Firm*—Jenkens & Gilchrist, P.C.

[57] ABSTRACT

An antenna assembly, and an associated method, which exhibits a selected the antenna beam configuration. The direction of a primary lobe and of a null is selected to improve the signal-to-noise and signal-to-interference ratios of communication signals transmitted between two communication stations. When implemented to form a portion of a base station of a cellular communication system, the traffic capacity of the communication system can be increased and the infrastructure costs of the system can be reduced.

14 Claims, 7 Drawing Sheets

96

| θ NULL | USE +45° (SOLID) | USE -45 °(DASHED) |
|---|---|---|
| -45° < θ ≤ -35° | 0 | 1 |
| -35° < θ ≤ -25° | 1 | 0 |
| -25° < θ ≤ -15° | 0 | 1 |
| -15° < θ ≤ -5° | 1 | 0 |
| etc. | etc. | etc. |

ANTENNA ASSEMBLY AND ASSOCIATED METHOD FOR RADIO COMMUNICATION DEVICE

TECHNICAL FIELD OF THE INVENTION

The present invention relates generally to a wireless communication system, such as a cellular communication system, which includes radio communication stations. More particularly, the present invention relates to an antenna assembly, and an associated method, which facilitates the communication of radio communication signals generated during operation of the radio communication system. The antenna beam pattern formed by the antenna assembly is selected to permit the antenna assembly to exhibit high carrier-to-noise and carrier-to-interference ratios.

BACKGROUND OF THE INVENTION

A communication system is formed, at a minimum, of a transmitter and a receiver connected by way of a communication channel. Information-containing, communication signals generated by the transmitter are transmitted upon the communication channel to be received by the receiver. The receiver recovers the informational content of the communication signal.

A wireless, or radio, communication system is a type of communication system in which the communication channel is a radio frequency channel defined upon the electromagnetic frequency spectrum. A cellular communication system is exemplary of a wireless communication system.

The communication signal transmitted upon the radio frequency channel is formed by combining, i.e., modulating, a carrier wave together with the information which is to be transmitted. The receiver recovers the information by performing a reverse process, i.e., demodulating, the communication signal to recover the information.

When the communication signal transmitted by the transmitter is received at the receiver, the communication signal must be of at least a minimum energy level and signal quality level to permit the receiver to recover the informational content of the transmitted signal.

Several other factors affect the recovery of the informational content of the transmitted signal.

The signal transmitted upon the communication channel to the receiver is susceptible to, for instance, reflection. Signal reflection of the transmitted signal causes the signal actually received by the receiver to be the summation of signal components transmitted by the transmitter by way of, in some instances, many different paths, in addition to, or instead of, a direct, line-of-sight path. As the distance separating the transmitter and receiver increases, however, the reflected signal components become increasingly less significant than signal components transmitted upon direct, or nearly-direct, paths. As the distance separating the transmitter and receiver increases, therefore, a highly-directional antenna is best able to detect signals transmitted by a transmitter. Because reflected signal components form relatively insignificant portions of the signal received by the receiver at such increased separation distances, a directional antenna directed towards the transmitter detects significant portions of the signal while also maximizing the coverage area of the receiver. A nondirectional antenna, capable of detecting greater levels of reflected signal components, is not required.

A signal simultaneously-transmitted by another transmitter upon the same, or similar, communication channel can interfere with the signal desired to be transmitted to a receiver. The signal transmitted to the receiver is therefore also susceptible to interference caused by such a simultaneously-transmitted signal. Co-channel and adjacent-channel interference are exemplary of types of interference to which the signal transmitted to the receiver might be susceptible.

As noted previously, when the distance separating the transmitter and receiver is relatively significant, a line-of-sight signal component becomes increasingly stronger vis-a-vis reflected signal components. And, at increased separation distances, reflected signal components form only a negligible amount of the power of the signal received by the receiver.

A directional antenna is best able to recover the informational content of a transmitted signal when the signal received at the receiver does not include significant levels of multipath signal components. Additionally, when the directional antenna includes nulls encompassing the locations from which interfering signals are transmitted, the interference caused by such interfering signals can be best minimized.

As mentioned previously, a cellular communication system is a wireless communication system. A cellular communication system includes a plurality of spaced-apart, fixed-site transceivers, referred to as base stations, positioned throughout a geographic area. Each of the base stations supplies a portion, referred to as a cell, of the geographic area. A moveably positionable, or otherwise mobile, transceiver, referred to as a mobile unit, can be positioned at any location (i.e., within any cell) within the geographic area encompassed by the cellular communication system. The mobile unit, when so-positioned, can transmit communication signals to at least one of the base stations.

As the mobile unit moves between cells, the mobile unit is "handed-off" from one base station to another base station. That is to say, when a mobile unit in communication with a first base station travels out of the cell defined by the first base station and into the cell defined by a second base station, the mobile unit commences communication with the second base station. The hand-off from the first base station to the second base station occurs automatically and without apparent interruption in communication by one communicating by way of the cellular communication system.

Typically, the base stations of the cellular communication system each include an antenna device for transmitting signals to, and receiving signals from, mobile stations located anywhere within the cell. The signal actually received by the base station is sometimes a complex interference pattern formed of various reflections of the transmitted signals transmitted from the mobile by way of many various paths of a multipath channel and also of interfering signal components generated by other mobile units. The other mobile units may, for example, be in communication with another base station or be transmitting signals on an adjacent communication channel.

For the same reasons as those described above with respect to a generic transmitter and receiver, as the distance separating the mobile unit and a base station increases, the power of the multipath components tend to become progressively weaker relative to a signal transmitted upon a direct path between the mobile unit and the base station. A directional antenna is best able to receive such a signal and is also capable of maximizing the range of operability of the base station to send and to receive signals. To minimize the effects of interference caused by the transmission of signals generated by other mobile units, nulls forming a portion of the antenna beam configuration located at the position of the other mobile units can best minimize the adverse effects of such interfering signals.

As utilization of cellular communication networks, as well as other types of wireless communication systems, become increasingly popular, it has become increasingly necessary to efficiently utilize the radio frequency channels allocated for such communication. In the example of a cellular communication system, a base station having an antenna apparatus exhibiting increased carrier-to-noise and carrier-to-interference ratios would facilitate efficient utilization of the allocated frequency channels. Other types of wireless communication systems would similarly benefit from the utilization of such an antenna.

It is in light of this background information related to wireless communication systems, such as a cellular communication system, that the significant improvements of the present invention have evolved.

SUMMARY OF THE INVENTION

The present invention advantageously provides an antenna assembly, and an associated method, which facilitates the communication of radio communication signals generated during operation of a radio communication system. The antenna assembly forms an antenna beam pattern which exhibits high gain and which limits the effects of interfering signals. Because the antenna beam pattern exhibits high gain, the range of the communication system is improved. And, because the effects of interfering signals are limited, the capacity of the communication system is increased.

When the antenna assembly of an embodiment of the present invention forms a portion of a base station of a cellular, communication system, the coverage area of the base station can be increased, and the traffic capacity of the base station can also be increased. Selection of an antenna beam pattern to be formed by the antenna assembly permits the antenna beam pattern to exhibit an elongated lobe to facilitate communication with a distantly-positioned mobile unit. Also, interference, such as co-channel interference, generated by another mobile unit transmitting signals on the same, or similar, channel as that upon which signals are transmitted by a desired, mobile unit, is minimized by introducing nulls extending in the direction of the interfering, mobile unit. Because the coverage range of the base station and also the traffic capacity permitted with the base station are increased, a lesser number of base stations can be utilized in a cellular, communication network while also increasing the transmission capacity of the network. More efficient utilization of the limiting frequency spectrum allocated for cellular communication can thereby result.

In accordance with these and other aspects, therefore, an antenna assembly exhibits a selected antenna beam pattern having a lobe extending in a first direction. An antenna array is formed of a first selected number of antenna elements. A beamforming matrix device is coupled to the antenna elements of the antenna array. The beamforming matrix device causes the selected antenna beam pattern to be formed by the antenna array. The beamforming matrix device has a second selected number of output ports wherein the first selected number is of a value at least as great as the second selected value.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
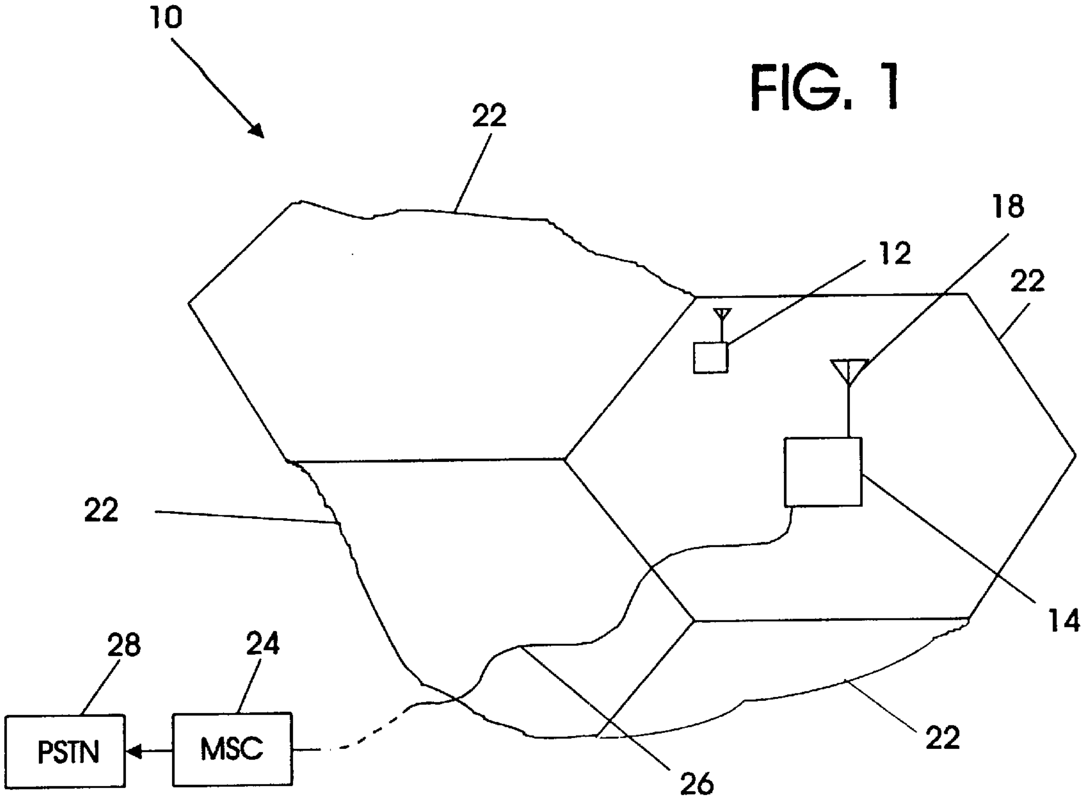
FIG. 1 is a partial functional block, partial schematic diagram of a portion of a cellular communication system.

Referring first to FIG. 1, a portion of a communication system, shown generally at 10, is shown. The communication system 10 is a wireless, or radio, communication system and permits communication between a transmitting location, here a movably-positionable, remotely-positioned transceiver 12 and a receiver, here a fixed-location transceiver 14. In the embodiment illustrated in the figure, the communication system 10 forms a cellular, communication system, the transceiver 12 forms a mobile unit, and the transceiver 14 forms a base station. The terms transceiver 12 and mobile unit 12 shall be used interchangeably below, and the terms transceiver 14 and base station 14 shall similarly be used interchangeably below. While the exemplary illustration of FIG. 1 illustrates a cellular communication system, other types of wireless communication systems having a transmitter and a receiver can be similarly represented.

Communication signals generated by the mobile unit 12, "uplink" signals, are transmitted upon one or more radio frequency communication channels. The base station 14 includes transceiver circuitry having a transmitter portion and a receiver portion. The receiver portion of the base station 14 is tuned to the radio frequency channel or channels upon which the communication signals generated by the mobile unit are transmitted.

The communication signals transmitted by the mobile unit 12 are detected by antenna apparatus 18 coupled to the base station 14 and forming a portion thereof. The antenna apparatus 18 converts the radio frequency, electromagnetic signals into electrical signals which are processed by the receiver circuitry portion of the base station 14.

The base station 14 defines a "cell" 22. When the mobile unit 12 is positioned at any location within the cell, two-way communication is permitted between the mobile unit and the base station 14 as communication signals generated at the base station, "downlink" signals, are transmitted to the mobile unit 12.

The portion of the communication system 10 illustrated in the figure includes a single base station 14 and portions of several cells 22 in addition to the cell 22 associated with the illustrated base station 14. An actual cellular communication system, of course, typically includes a plurality of base stations and a corresponding plurality of cells formed throughout a geographical area. Once the cellular network is installed throughout a geographical area, large numbers of mobile units, similar to the mobile unit 12 can concurrently communicate, in conventional fashion, with the base stations of the cellular communication network.

The base station 14, as well as other base stations of the communication system 10, is coupled to a mobile switching center 24, here indicated by way of lines 26. The mobile switching center 24 is, in turn, coupled to a public service telephonic network (PSTN) 28. Communication is thereby permitted between a mobile unit, such as the mobile unit 12, and any calling station coupled to the PSTN 28, all in conventional manner.

FIG. 2 again illustrates the communication system 10. The mobile unit 12 is again positioned to permit two-way communication with the base station 14. Uplink signals generated and transmitted by the mobile unit 12 are detected by the antenna apparatus 18 of the base station 14 and converted into electrical signals to be processed by receiver circuitry of the base station 14. And, downlink signals generated at the base station 14 are transmitted by way of the antenna apparatus 18 to the mobile unit 12. The base station 14 is again shown to be coupled to the mobile switching center 24 by way of lines 26, and the mobile switching center 24 is again shown to be coupled to the PSTN 28.

Figure 2:
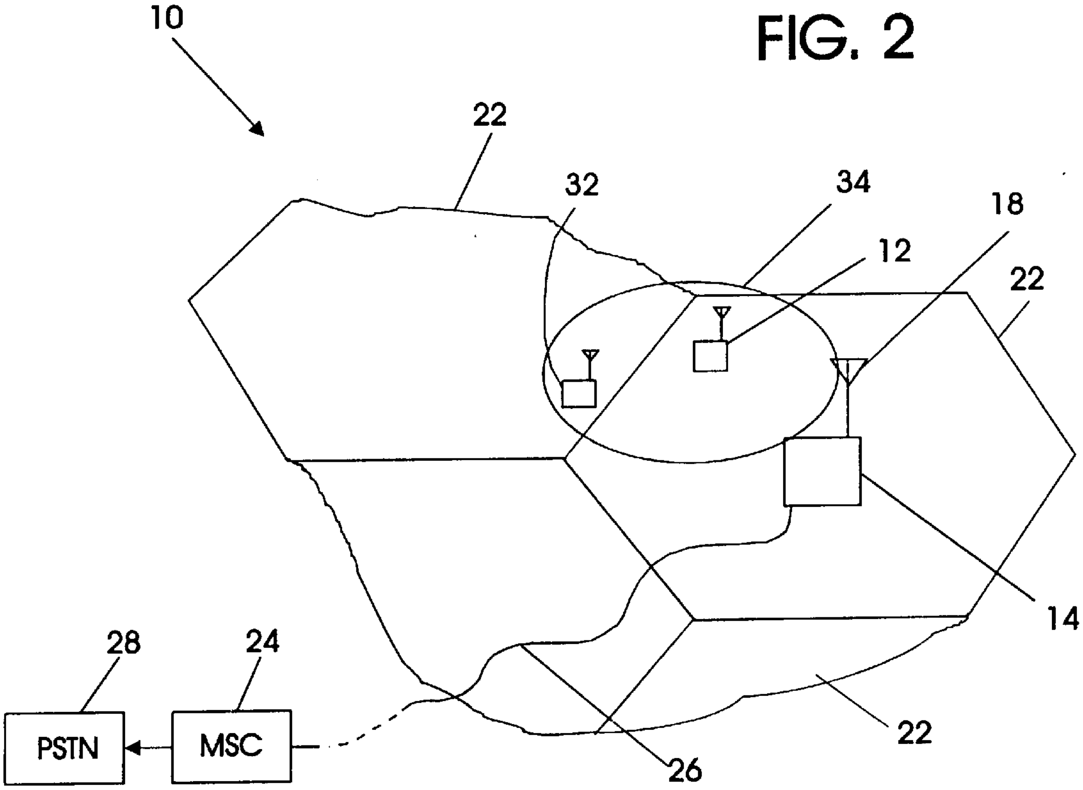
FIG. 2 is a diagram, similar to that shown in FIG. 1, but which further illustrates an antenna pattern exhibited by antenna apparatus of a base station forming a portion of the cellular, communication system.

FIG. 2 further illustrates a second mobile unit 32 which, for purposes of illustration, is positioned within a cell other than the cell in which the mobile unit 12 is positioned. The second mobile unit 32 is within the communication range of the base station 14, as indicated by the antenna beam pattern 34 exhibited by the antenna apparatus 18. When operated, the mobile unit 32 communicates with a base station other than the illustrated base station 14.

If, however, the mobile unit 32 is transmitting signals on the same channel as the channel upon which the mobile unit 12 transmits signals, such transmission by the second mobile unit 32 might interfere with the signals transmitted by the mobile unit 12, when received at the base station 14. If such interference is significant, communication between the mobile unit 12 and the base station 14 might be interrupted or even precluded.

While cellular networks are generally constructed such that mobile units positioned in adjacent cells 22 do not transmit signals concurrently on the same communication channels, thereby to reduce the possibility of such co-channel interference, if the antenna beam pattern 34 is of characteristics to permit detection of interfering signals generated by communication devices in non-adjacent cells, interference can interfere with desired communications.

FIG. 3 again illustrates the communication system 10. The communication system is again shown to include a mobile unit 12, base station 14, and antenna apparatus 18 which detects uplink signals transmitted by the mobile unit and transmits downlink signals to the mobile unit when the mobile unit is positioned within the cell 22 defined by the base station. And, the base station 14 is again shown to be coupled to a mobile switching center 24 by way of lines 26 and, then, to the PSTN 28. The second mobile unit 32 is also again positioned in a cell 22 other than the cell in which the mobile unit 12 is positioned.

In this illustration, the antenna apparatus 18 exhibits an antenna beam pattern 44 having an elongated lobe extending in a first axial direction, indicated by the line 46 and a null extending in a second axial direction, indicated by the line 48.

Because of the directionality of the antenna beam pattern 44, interference caused by interfering signals generated by the second mobile unit 32 is lessened in contrast to the antenna beam pattern 34 exhibited by the antenna apparatus 18 in the illustration of FIG. 2. Also, because the antenna lobe forming the antenna beam pattern 44 is elongated, the range of communication permitted between the base station 14 and a mobile unit is increased.

Such increase permits the cell 22 defined by the base station 14 to be increased, here indicated by the cell 22', shown in dash in the figure. Such communication range increase permitted of a base station, such as the base station 14, permits a smaller number of base stations required to be positioned throughout a geographical area to form the fixed network of the cellular, communication system. In other types of communication systems, the increased communication range permitted of an elongated lobe configuration permits analogous types of improvements or cost-savings to be achieved.

Figure 4:
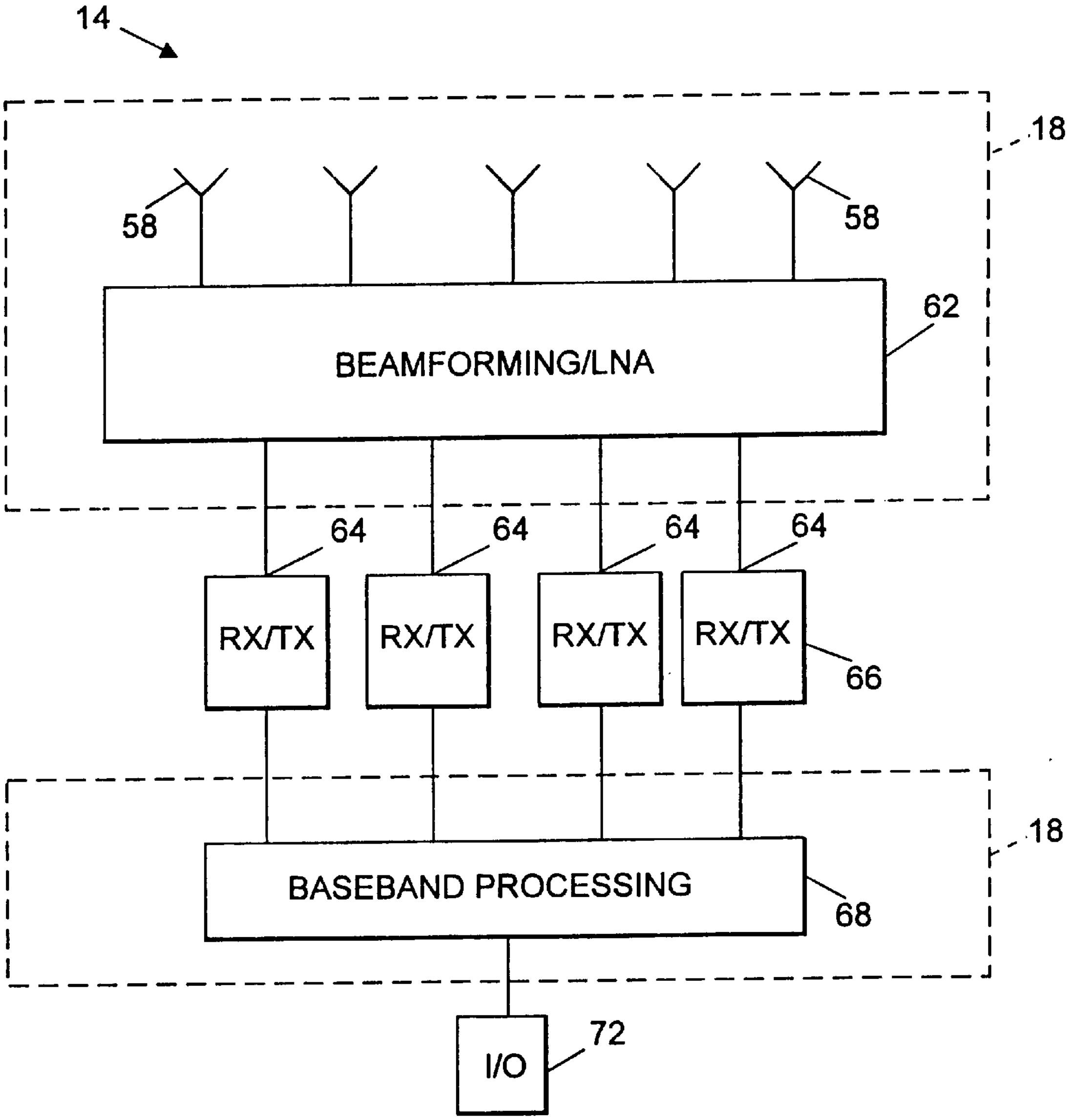
FIG. 4 is a functional block diagram of a transceiver, such as a base station forming a portion of the cellular communication system illustrated in the preceding figures, which includes an embodiment of the antenna assembly of the present invention as a portion thereof.

FIG. 4 illustrates in greater detail a transceiver, here the base station 14, which includes the antenna assembly 18 of an embodiment of the present invention. The base station 14 is exemplary of a communication device which includes the antenna assembly as a portion thereof. Other types of communication devices can similarly include a similar such antenna assemblies.

The antenna assembly includes a plurality, m, of antenna elements 58 which together form an antenna array. Each of the antenna elements 58 is coupled to a beamforming device 62 which preferably includes a low-noise amplifier. The beamforming device may, for example, be formed of a Butler matrix or other type of radio frequency, beamforming device. The device 62 is coupled to the ports 64 of a plurality, r, of transceiver elements 66. As indicated in the figure, the number of antenna elements 58 is at least as great as the number of ports 64 and, hence, transceiver elements coupled in parallel to the beamforming device 62. That is to say, in algebraic form, utilizing the just-noted nomenclature, $m \geqq r$.

Each of the transceiver elements 66 is coupled to a base band processing device 68. Signals received by the antenna elements 58 are down-converted by receiver portions of the transceiver elements 66 and applied to the processing device 68. Analogously, signals applied to the processing device 68 by an input and output interface device 72 are provided, once processed by the processing device 68 to the transmitter portions of the transceiver elements 66. Thereat, the signals upconverted in frequency to radio frequencies and provided to the beam forming device 62. Thereafter, the signals are transmitted by the antenna elements 58.

Figures 3, 8:
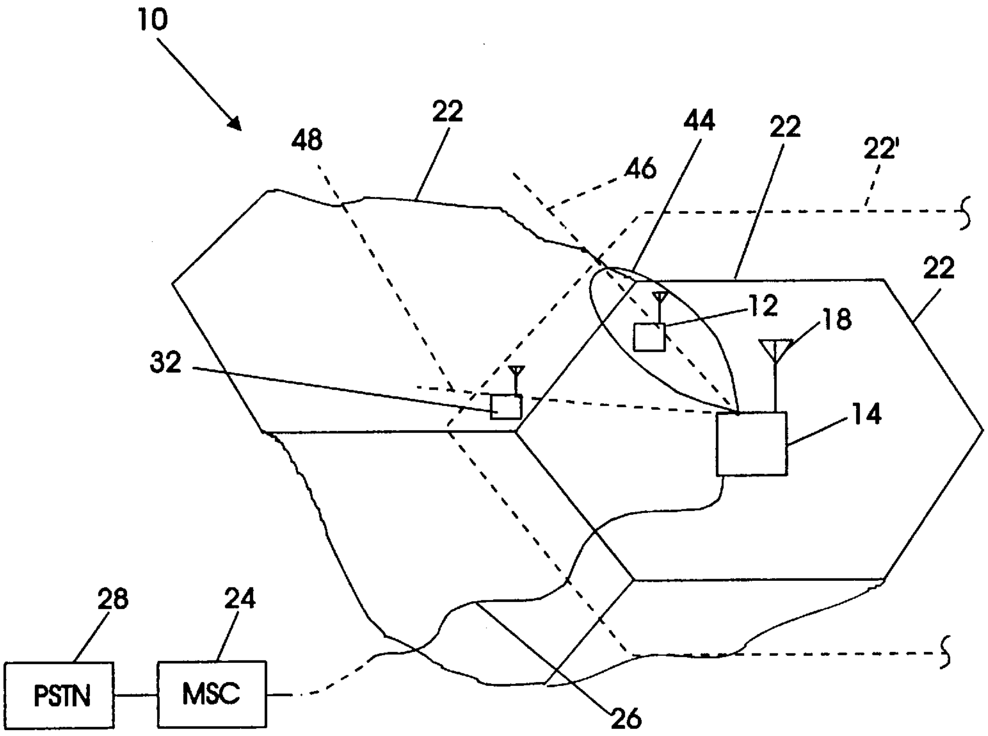
FIG. 3 is a diagram, similar to that shown in FIG. 2, but which illustrates an antenna beam pattern exhibited by the base station which permits the communication range to be increased and which permits the effects of interference of interfering signals to be reduced according to an embodiment of the present invention.
FIG. 8 is a functional, block diagram of a look-up table forming a portion of the base station shown in FIG. 6.

The antenna beam pattern 44 illustrated in FIG. 3 is formed both by the beamforming device 62 and also by the baseband processing device 68 to facilitate best transmission and reception of communication signals.

For instance, and with respect to the communication system 10 illustrated in FIG. 3, the beamforming device 62, in one embodiment of the present invention, selects an initial antenna beam configuration to be exhibited by the antenna assembly. Such antenna beam configuration is initially selected in a manner believed best to receive an uplink signal generated by a mobile unit, such as the mobile units 12. When an uplink signal is received by the antenna elements 58, supplied to the receiver portions of the transceiver elements 66 and down-converted in frequency, the signals are provided to the baseband processing device 68.

Because beamforming is utilized to receive initially the uplink signal, the quality of the received signal is improved. And, because of the improved quality of the received signal, the baseband processing device is better able to estimate, in conventional manner, channel characteristics of the channels upon which signals are communicated between the mobile unit and base station.

Beamforming operations can be performed thereafter at the baseband processing device to improve further the selection of the antenna beam configuration to be exhibited by the antenna assembly when thereafter transmitting downlink signals to the mobile unit. The characteristics of the antenna lobe can be adjusted, and nulls can be formed to minimize interference, all in a manner to improve the signal-to-noise and signal-to-interference ratios.

Figure 5:
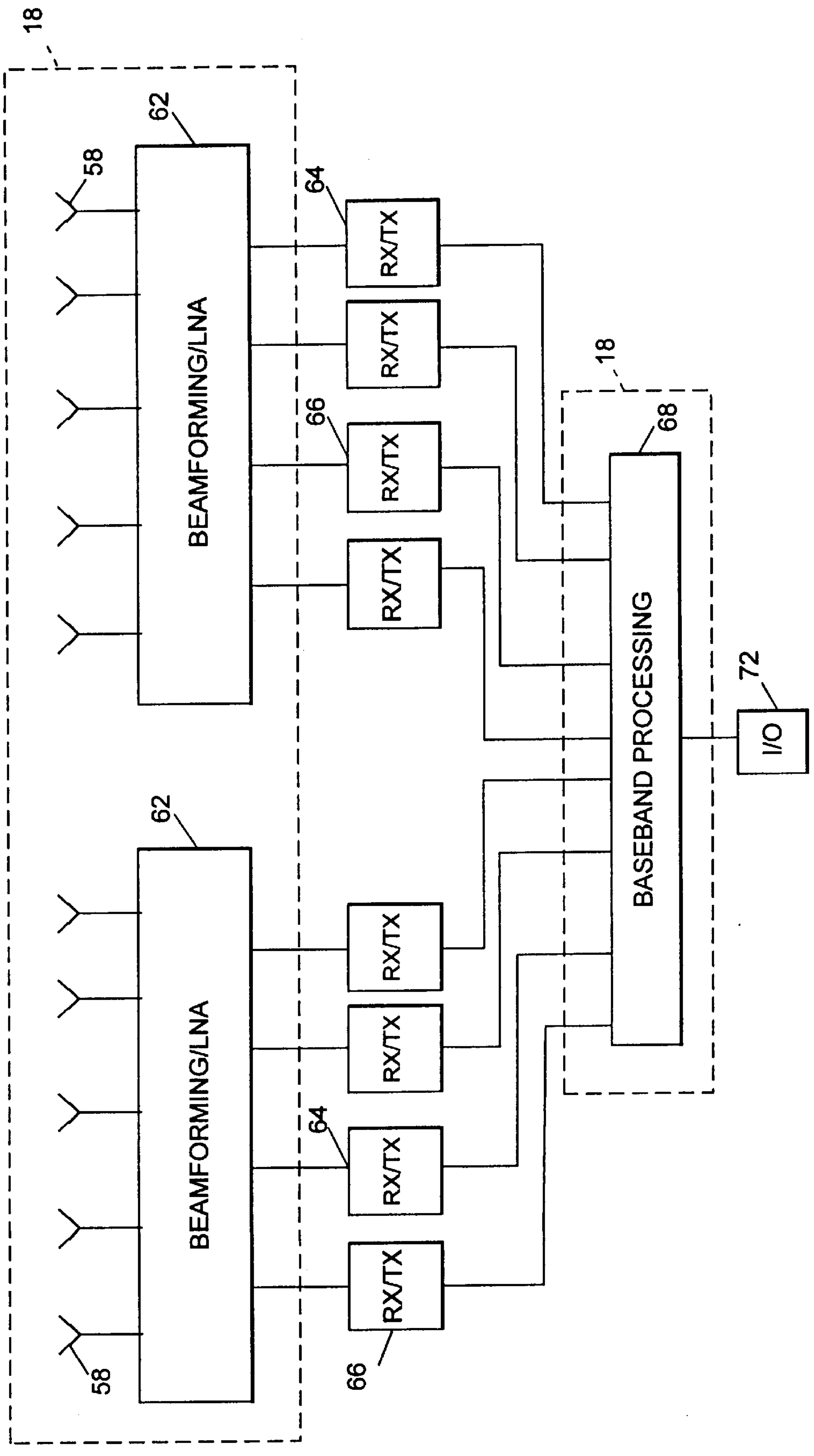
FIG. 5 is a functional block diagram, similar to that shown in FIG. 4, but which illustrates a transceiver including an alternate embodiment of the antenna assembly of the present invention.

FIG. 5 illustrates an antenna assembly 18 of another embodiment of the present invention. In this embodiment, two sets of antenna elements 58 form two separate antenna arrays. The two antenna arrays are spatially separated from one another. In the illustrated embodiment, each array is formed of the same number, m, of antenna elements 58.

The first array of antenna elements is coupled to a first beamforming device 62, and the second array of antenna elements 58 is coupled to a second beamforming device 62. The beamforming devices 62 again also preferably include low-noise amplifiers. The beamforming devices 62 are operative in manner similar to operation of the single beamforming device forming a portion of the antenna assembly 18 of the embodiment illustrated in FIG. 4.

The first beamforming device 62 is coupled to the ports 64 of a first set of transceiver elements 66, and the second beamforming device is coupled to the ports 62 of a second set of transceiver elements 66. Both sets of transceiver elements 66 are coupled to a baseband processing device 68, and the baseband processing device 68 is coupled to an input and output interface 72.

The embodiment of the antenna apparatus 18 shown in FIG. 5 permits separate beam patterns to be formed by the first and the second antenna arrays. By appropriately selecting the beam patterns and then interleaving the beam patterns, nulls can be formed. For instance, a null can be formed by forming orthogonally-polarized beam patterns which are interleaved together.

Figure 6:
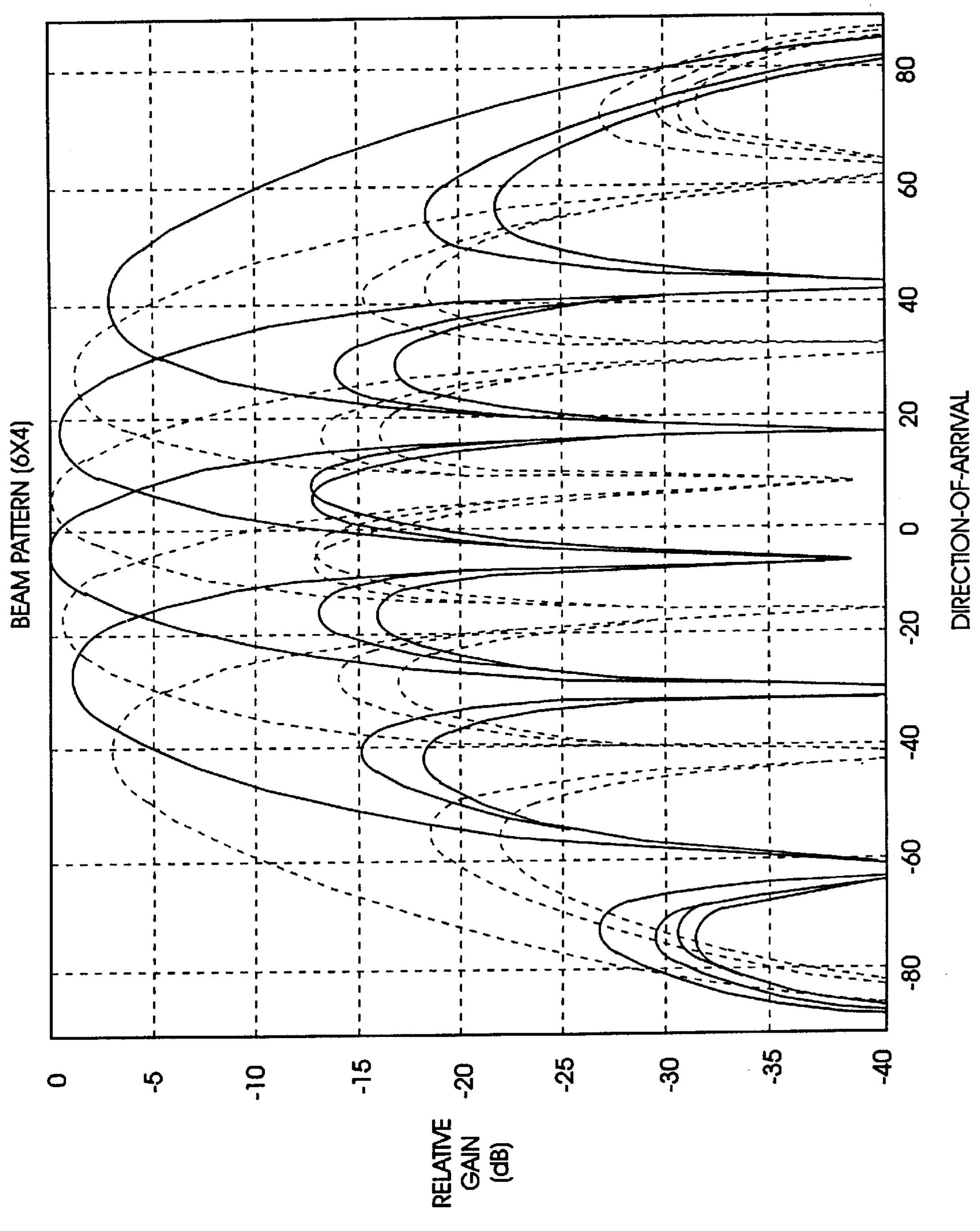
FIG. 6 is a graphical representation of an exemplary antenna beam pattern formed during operation of an embodiment of the present invention.

FIG. 6 illustrates orthogonally-polarized beam patterns. The beam patterns illustrated in solid line are polarized in a positive 45° direction and the beam patterns indicated by the dashed lines are polarized in a negative 45° direction. The orthogonal polarization directions can, for instance, during baseband signal processing by the base band processor 68, be utilized as two r diversity branches for both uplink and downlink transmission of signals. The beampatterns illustrated in FIG. 6 are formed when six antenna elements form each array of antenna elements and four transceiver elements are connected to each of the arrays of antenna elements. Examination of the figure indicates that the diversity branches cover partly disjunct areas.

To minimize problems associated with hardware errors when a null is directed towards an angle at which side lobes of an antenna lobe is formed, the transmission direction can be appropriately altered so that the beampattern for the polarization-direction includes "natural" nulls. Other beam patterns formed by antenna beam configurations of other polarizations can similarly be illustrated.

Figure 7:
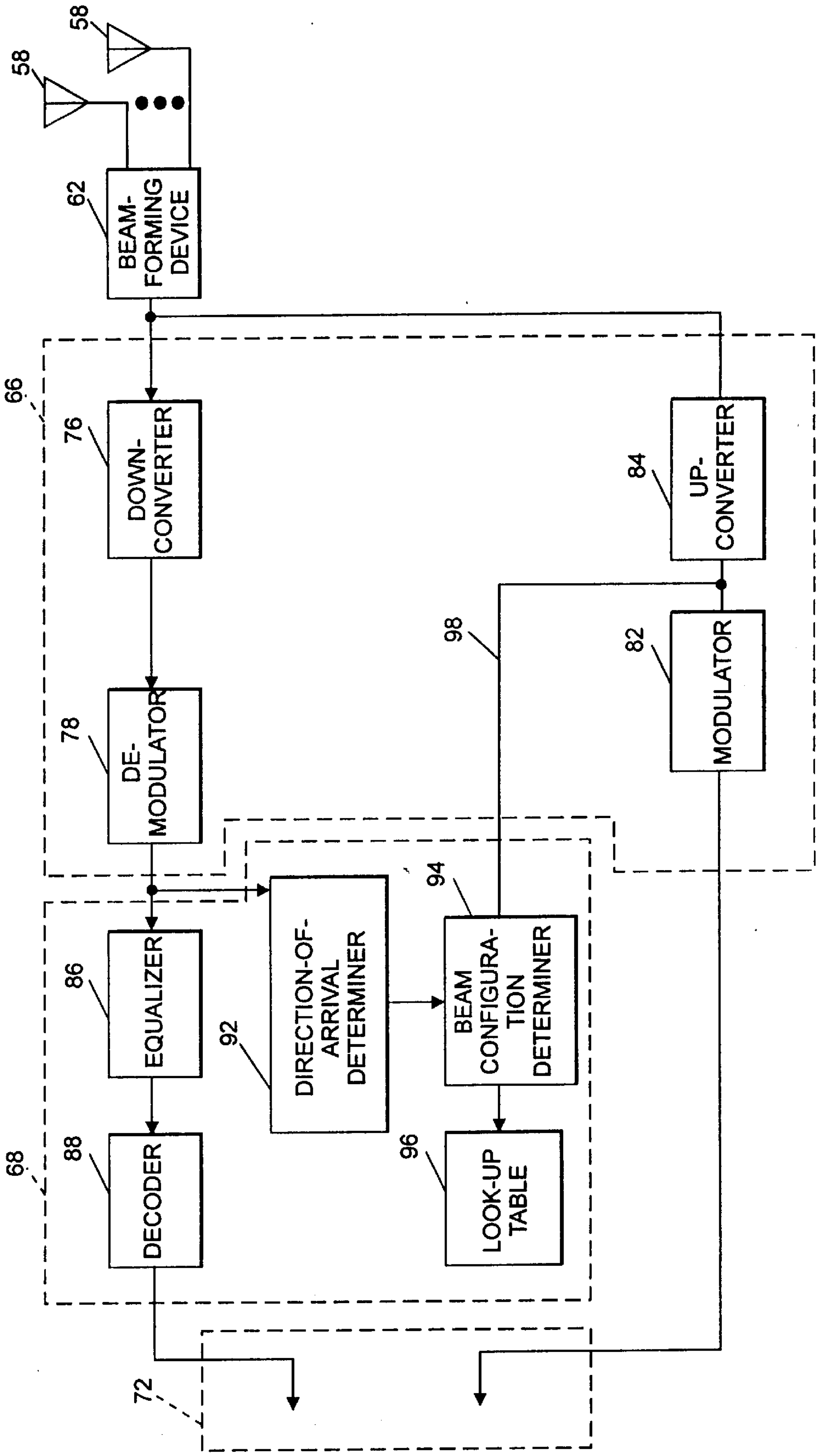
FIG. 7 is a functional block diagram of a base station of an embodiment of the present invention which forms a portion of the cellular communication system shown in FIGS. 1–3.

FIG. 7 illustrates a base station 14 of an embodiment of the present invention. An antenna assembly 18 such as one of the antenna assemblies 18 shown in FIGS. 4 and 5 form a portion of the base station.

A plurality of antenna elements 58 are positioned to receive signals transmitted to the base station and to transmit signals generated at the base station. The antenna elements are coupled to a beamforming device 62. If the antenna assembly is formed of the embodiment illustrated in FIG. 5, the antenna elements are formed in two separate arrays, spatially separated from one another, wherein the antenna elements of the two different arrays are coupled to a first and second beamforming device 62, all as described previously. The beamforming device, or devices, 62 are coupled to the transceiver elements 66. For purposes of illustration, only one transceiver element is pictured and is shown to be formed of a receiver portion and transmitter portion. Additional transceiver elements positioned in parallel with the illustrated transceiver element can be similarly shown.

The receiver portion of the illustrated transceiver element 66 includes a down-converter 76 and a demodulator 78. The transmitter portion of the illustrated transceiver element 66 is shown to include a modulator 82 and an up-converter 84.

The transceiver element 66 is coupled to the baseband processing device 68 which is here shown to include an equalizer 86 and decoder 88, operable in conventional manner to equalize and to decode, respectively, the uplink signals received at the base station in conventional fashion.

The baseband processor is again shown to be coupled to the input and output interface 72.

The baseband processor 68 is also shown to include a direction of arrival determiner 92 coupled to receive the demodulated signal generated by the demodulator 78. The direction of arrival determiner 92 is also coupled to receive the demodulated signals generated by the demodulators of the receiver portions of others of the transceiving elements (not shown). The direction of arrival determiner is operative to determine the direction from which the uplink signal received at the antenna elements 58 is transmitted. The direction of arrival determiner is further operative to determine the direction of a null of an antenna beam configuration to be formed by the antenna elements 58.

The direction of arrival determiner 92 is coupled to a beam configuration determiner 94. The beam configuration determiner is also coupled to a memory element forming a look-up table 96. The beam configuration determiner 94 is operative to access data stored in the look-up table to determine the direction of the lobe of the antenna pattern configuration which is to be formed by the antenna elements 58. The location of the look-up table which is accessed by the beam configuration determiner 94 is determined responsive to the values determined by the direction of arrival determiner 92.

The direction in which the null is to be directed, as determined by the direction of arrival determiner 92 and the direction in which the elongated lobe is to extend, as determined by the beam configuration determiner 94, is supplied by way of line 98 to the transceiver element 66, here at a location prior to the up-converter 84. In other embodiments, such information can be provided to other locations. In such manner, the antenna beam configuration to be formed by the antenna elements 58 is selected. Additional beamforming, as noted previously, can be caused by the radio frequency, passive beamforming device 62.

FIG. 8 illustrates the contents of an exemplary look-up table 96. The direction of the null is indexed relative to directions in which the elongated lobe of the antenna beam configuration is to extend, either in a positive 45° direction or a negative 45° direction.

Figure 9:
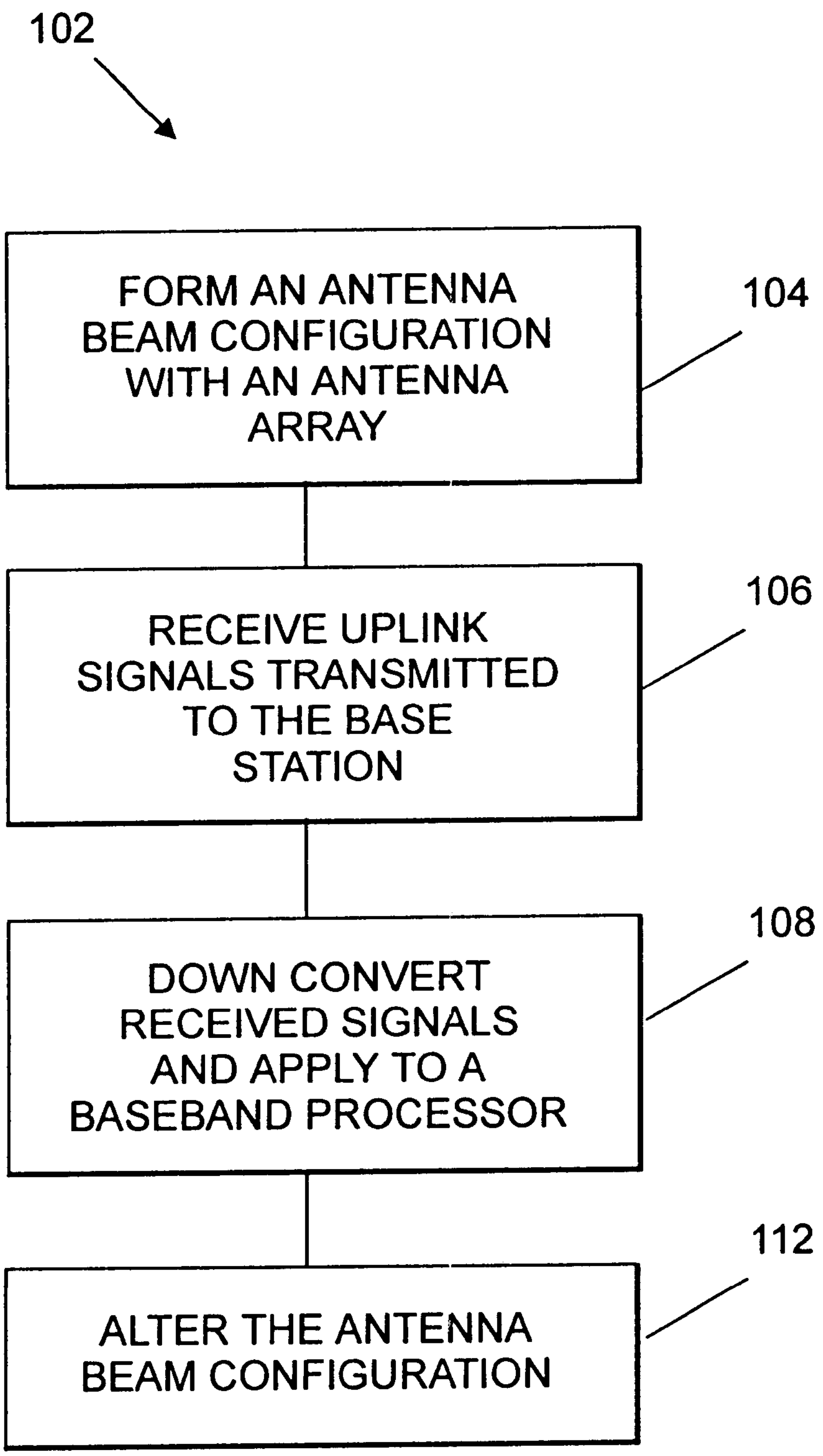
FIG. 9 is a flow diagram illustrating the method of operation of an embodiment of the present invention.

FIG. 9 illustrates a method, shown generally at 102, of an embodiment of the present invention. The method facilitates communication of communication signals between two communication devices, such as a mobile unit and base station of a cellular communication system. First, and as indicated by the block 104, an initial antenna beam pattern configuration is formed by an array of antenna elements forming a portion of an antenna assembly of the base station. Then, and as indicated by the block 106, uplink signals transmitted to the base station are received by the antenna elements of the antenna array.

The receive signals are applied to receiver portions of the transceiver circuitry of the base station, down-converted in frequency, and applied to a baseband processing device, as indicated by the block 108.

The baseband processor determines a preferred antenna beam pattern configuration to be formed by the antenna array responsive to characteristics of the received signals. Thereafter, and as indicated by the block 112, the antenna beam pattern configuration exhibited by the array of antenna elements is altered responsive to such determines.

Because the antenna beam configuration is selected to increase the signal-to-noise and signal-to-interference ratios, the communication range and the capacity of the base station 14 can be increased. Increased capacity, at lessened infrastructure costs can result through operation of the various embodiments of the present invention. Other types of communication devices and systems can similarly be improved through the implementation of the various embodiments of the present invention.

The previous descriptions are of preferred examples for implementing the invention and the scope of the invention should not necessarily be limited by this description. The scope of the present invention is defined by the following claims.

What is claimed is:

1. In a radio transceiver having an array of transceiver elements operable to transceive radio frequency signals, an improvement of an antenna assembly which exhibits a selected directional antenna beam pattern having an elongated lobe extending in a first direction and a null extending in a second direction, said antenna assembly comprising:

a first antenna array formed of a first selected number of antenna elements;

a second antenna array formed of a second selected number of antenna elements:

a beamforming matrix device for causing the formation of the elongated lobe, said beamforming matrix device including a first and second matrix beamformer respectively coupled to the first and second antenna arrays, said first and second matrix beamformers operable to respectively cause the formation of a first and second polarized antenna beam pattern, where said first and second polarized antenna beam patterns are substantially orthogonal to one another and interleaved by said beamforming matrix device to cause the formation of the null for attenuating energy due to interference; and a processor coupled to each transceiver element of the array of transceiver elements and to said beamforming matrix device, said processor for processing signals provided thereto by the transceiver elements to determine the first direction in which the elongated lobe is to extend and the second direction in which the null is to extend, said processor further for providing indications of the first and second directions, respectively, determined thereat to said beamforming matrix device.

2. The antenna assembly of claim 1, wherein the first matrix beamformer and the second matrix beamformer are separated by at least a minimum separation distance.

3. The antenna assembly of claim 2 wherein the radio transceiver is formed of a radio base station of a cellular communication network operable to communicate with at least one mobile station and wherein said antenna array is operative to transmit downlink signals to, and to receive uplink signals transmitted by, said at least one mobile station.

4. The antenna assembly of claim 1 wherein said processor further computes direction-of-arrival indications responsive to the signals received by said array of transceiver elements.

5. The antenna assembly of claim 1 further comprising a memory look-up device coupled to said processor, said memory look-up device for storing data associated with at least one direction in which the first elongated lobe of the selected antenna pattern can extend.

6. The antenna assembly of claim 5 wherein said processor accesses the data stored in said memory look-up device to determine the first direction in which the elongated lobe of the antenna pattern is to extend.

7. An antenna assembly used in a cellular communication system for exhibiting a selected antenna beam pattern consisting of a lobe extending toward a mobile station and a null extending toward a location where an interfering signal is transmitted, said antenna assembly comprising:

a first antenna array having a plurality of antennas;

a second antenna array having a plurality of antennas;

a beamforming device for causing the formation of the lobe, said beamforming device including a first and second matrix beamformer respectively coupled to the first and second antenna arrays, said first and second matrix beamformers for respectively causing the formation of a first and second polarized antenna beam pattern, where said first and second polarized antenna beam patterns are substantially orthogonal to one another and interleaved by said beamforming matrix device to cause the formation of the null for attenuating energy due to said interfering signal; and a transceiver array coupled to the beamforming device; and a processor coupled to the transceiver array, said processor including:

a direction-of-arrival determiner responsive to receiving a signal from the transceiver array for determining a first direction for extending the lobe and a second direction for extending the null;

a look-up table for storing data; and a beam configuration determiner coupled to the look-up table and the direction-of-arrival determiner, said beam configuration determiner for accessing the stored data in response to the determined first and second directions to provide indications of the first and second directions to said beamforming device.

8. The antenna assembly of claim 7, further comprising an input and output device coupled to the processor.

9. The antenna assembly of claim 7, wherein said transceiver array includes a plurality of transceivers and a plurality of receivers, where each transceiver includes a modulator and up-converter and each receiver includes a demodulator and down-converter.

10. The antenna assembly of claim 7, wherein said processor includes means for updating the selected antenna beam pattern in response to receiving a subsequent signal from the transceiver array.

11. A method used in a cellular communication system for exhibiting a selected antenna beam pattern consisting of a lobe extending toward a mobile station and a null extending toward a location where an interfering signal is transmitted, said method comprising the steps of:

transmitting an initial antenna beam pattern;

receiving a signal;

determining, responsive to the received signals, a first direction for extending the lobe and a second direction for extending the null;

forming the selected antenna beam pattern in response to determining the first and second directions, said step of forming further including the steps of:

forming the lobe, a first antenna beam pattern and a second antenna beam pattern;

orthogonally polarizing the first antenna beam pattern and a second antenna beam pattern; and interleaving the orthogonally polarized first and second antenna beam patterns so as to cause the formation of the null for attenuating energy due to the interfering signal;

transmitting the selected antenna beam pattern; and updating, responsive to receiving a subsequent signal, the formed selected antenna beam pattern.

12. The method of claim 11, wherein said step of updating includes:

determining, responsive to the received subsequent signal, an updated first direction for extending the lobe and an updated second direction for extending the null; and forming, responsive to the determined updated first and second directions, the formed selected antenna beam pattern.

13. In a method for communicating in a radio communication system having a communication station including transceiver circuitry having an array of transceiver elements, an improvement of a method for transceiving communication signals at the communication station, said method comprising the steps of:

determining, responsive to signals received at the array of transceiver elements, a first direction in which an elongated lobe is to extend and a second direction in which a null is to extend of an antenna beam pattern to be exhibited by an antenna array, including using one of the first and second directions to determine the other of the first and second directions;

providing indications of the determined first direction and the determined second direction to a beamforming matrix device for causing the formation of the elongated lobe, said beamforming device including a first and second matrix beamformer respectively coupled to a first and second antenna array of the antenna array, said first and second matrix beamformers for respectively causing the formation of a first and second polarized antenna beam pattern, where said first and second polarized antenna beam patterns are substantially orthogonal to one another and interleaved by said beamforming matrix device to cause the formation of the null for attenuating energy due to interference; and forming the antenna beam pattern to be exhibited by the antenna array.

14. In a radio transceiver having an array of transceiver elements operable to transceive radio frequency signals, an improvement of an antenna assembly which exhibits a selected directional antenna beam pattern having an elongated lobe extending in a first direction and a null extending in a second direction, said antenna assembly comprising:

a first antenna array formed of a first plurality of antenna elements;

a second antenna array formed of a second plurality of antenna elements;

a beamforming matrix device for causing the formation of the elongated lobe, said beamforming matrix device including a first and second matrix beamformer respectively coupled to the first and second antenna arrays, said first and second matrix beamformers operable to respectively cause the formation of a first and second polarized antenna beam pattern, where said first and second polarized antenna beam patterns are substantially orthogonal to one another and interleaved by said beamforming matrix device to cause the formation of the null for attenuating energy due to interference; and a processor coupled to each transceiver element of the array of transceiver elements and to said beamforming matrix device, said processor for processing signals provided thereto by the transceiver elements to determine the first direction in which the elongated lobe is to extend and the second direction in which the null is to extend, where one of the first and second directions is used to determine the other of the first and second directions, said processor further for providing indications of the first and second directions to said beamforming matrix device.

* * * * *

UNITED STATES PATENT AND TRADEMARK OFFICE

CERTIFICATE OF CORRECTION

PATENT NO. : 5,924,020

DATED : Jul. 13, 1999

INVENTOR(S) : Forssén et al.

It is certified that error appears in the above-identified patent and that said Letters Patent is hereby corrected as shown below:

Column 9, line 60 Replace "elements:"
With --elements;--

Signed and Sealed this

Seventh Day of December, 1999

*Attest:*

Q. TODD DICKINSON

*Attesting Officer*

*Acting Commissioner of Patents and Trademarks*